US011493416B2

(12) United States Patent
Undi et al.

(10) Patent No.: US 11,493,416 B2
(45) Date of Patent: Nov. 8, 2022

(54) MEASUREMENT TUBE FOR A MEASURING DEVICE, MEASURING DEVICE FORMED BY MEANS OF SUCH A MEASUREMENT TUBE, AND PRODUCTION METHOD FOR SUCH A MEASUREMENT TUBE

(71) Applicant: Endress+Hauser Flowtec AG, Reinach (CH)

(72) Inventors: Torsten Undi, Rheinfelden (DE); Andreas Strub, Weil am Rhein (DE); Andris Kade, Maulburg (DE)

(73) Assignee: Endress+Hauser Flowtec AG, Reinach (CH)

( * ) Notice: Subject to any disclaimer, the term of this patent is extended or adjusted under 35 U.S.C. 154(b) by 641 days.

(21) Appl. No.: 16/469,578

(22) PCT Filed: Oct. 30, 2017

(86) PCT No.: PCT/EP2017/077763
§ 371 (c)(1),
(2) Date: Jul. 12, 2019

(87) PCT Pub. No.: WO2018/108378
PCT Pub. Date: Jun. 21, 2018

(65) Prior Publication Data

US 2020/0116611 A1 Apr. 16, 2020

(30) Foreign Application Priority Data

Dec. 14, 2016 (DE) ..................... 10 2016 124 358.2

(51) Int. Cl.
*G01N 9/32* (2006.01)
*G01F 1/32* (2022.01)
(Continued)

(52) U.S. Cl.
CPC ................. *G01N 9/32* (2013.01); *G01F 1/32* (2013.01); *G01F 1/58* (2013.01); *G01F 1/662* (2013.01);
(Continued)

(58) Field of Classification Search
CPC .......... G01N 9/32; G01N 19/00; G01N 11/04; G01F 1/32; G01F 1/58; G01F 1/662;
(Continued)

(56) References Cited

U.S. PATENT DOCUMENTS 5,962,790 A * 10/1999 Lynnworth ............. G01F 1/662 73/644
6,003,384 A * 12/1999 Frohlich ............... G01F 1/3263 73/861.22
(Continued)

FOREIGN PATENT DOCUMENTS

DE 102010043781 A1 1/2012
DE 102013013476 A1 2/2015
(Continued)

*Primary Examiner* — Nathaniel T Woodward
(74) *Attorney, Agent, or Firm* — Christopher R. Powers; Endress+Hauser (USA) Holding Inc.

(57) ABSTRACT

The present disclosure relates to a measurement tube including a tubular main body, which has a wall and a lumen, and a sensor holder, which is arranged on and integrally bonded to an outer lateral surface of the wall of the main body, opposite the lumen, the sensor holder configured to be mechanically connected to at least one sensor component for sensing at least one measurement variable of a measurement material located in the lumen. The sensor holder is at least partly produced by an additive manufacturing method directly on the lateral surface of the wall of the main body. In a method for producing such a measurement tube, liquefied material is applied to the outer lateral surface of the wall of the main body and allowed to resolidify there to form a
(Continued)

10
100
120a'
110a'
120
110
110a
110b part of the sensor holder, which part is integrally bonded to the wall of the main body.

25 Claims, 8 Drawing Sheets

(51) Int. Cl.

| | |
|---|---|
| ***G01F 1/58*** | (2006.01) |
| ***G01F 1/66*** | (2022.01) |
| ***G01F 1/684*** | (2006.01) |
| ***G01F 1/84*** | (2006.01) |
| ***G01F 15/18*** | (2006.01) |
| ***G01K 13/02*** | (2021.01) |
| ***G01L 19/00*** | (2006.01) |
| ***G01N 11/04*** | (2006.01) |

(52) U.S. Cl.
CPC ................ *G01F 1/684* (2013.01); *G01F 1/84* (2013.01); *G01F 15/18* (2013.01); *G01K 13/02* (2013.01); *G01L 19/00* (2013.01); *G01N 11/04* (2013.01)

(58) Field of Classification Search
CPC ............ G01F 1/684; G01F 1/84; G01F 15/18; G01K 13/02
USPC .......................................................... 73/32 A
See application file for complete search history.

(56) References Cited

U.S. PATENT DOCUMENTS

| | | | |
|---|---|---|---|
| 6,047,457 A | 4/2000 | Bitto et al. | |
| 2003/0019308 A1 | 1/2003 | Oppermann et al. | |
| 2009/0013798 A1 | 1/2009 | Hocker | |
| 2010/0031755 A1 | 2/2010 | Bitto et al. | |
| 2010/0139390 A1 | 6/2010 | Gimson et al. | |
| 2011/0120229 A1 | 5/2011 | Kossek et al. | |
| 2011/0303006 A1 | 12/2011 | Wunderlich et al. | |
| 2012/0227496 A1 | 9/2012 | Berger et al. | |
| 2015/0268082 A1 | 9/2015 | Kirst et al. | |
| 2015/0338252 A1 | 11/2015 | Schmidt et al. | |
| 2016/0069717 A1 | 3/2016 | Ramseyer et al. | |
| 2016/0202101 A1 | 7/2016 | Sparks | |
| 2016/0216145 A1 | 7/2016 | Berberig et al. | |
| 2016/0258792 A1* | 9/2016 | Potter ................ | G01L 19/0023 |

FOREIGN PATENT DOCUMENTS

| | | |
|---|---|---|
| DE | 102013114382 A1 | 6/2015 |
| DE | 102013114483 A1 | 6/2015 |
| DE | 102014112558 A1 | 3/2016 |
| DE | 102014114941 A1 | 4/2016 |
| DE | 102014115305 A1 | 4/2016 |
| DE | 102014115589 A1 | 4/2016 |
| DE | 102014119073 A1 | 6/2016 |
| EP | 0892251 B1 | 6/2001 |
| EP | 1413858 B1 | 8/2016 |
| WO | 2016034417 A1 | 3/2016 |

* cited by examiner

MEASUREMENT TUBE FOR A MEASURING DEVICE, MEASURING DEVICE FORMED BY MEANS OF SUCH A MEASUREMENT TUBE, AND PRODUCTION METHOD FOR SUCH A MEASUREMENT TUBE

CROSS-REFERENCE TO RELATED APPLICATIONS

The present application is related to and claims the priority benefit of German Patent Application No. 10 2016 124 358.2, filed on Dec. 14, 2016, and International Patent Application No. PCT/EP2017/077763, filed on Oct. 30, 2017, the entire contents of which are incorporated herein by reference.

TECHNICAL FIELD

The invention relates to a measurement tube provided for a measuring device, comprising a tubular main body and a sensor holder arranged thereon for a sensor, a production method for such a measurement tube or a measuring device formed by means of such a measurement tube.

BACKGROUND

Measuring devices are used in process control and automation technology to measure measurement variables of fluid or flowing measurement materials, namely, for example, liquids or gases flowing in pipelines, and comprise a measurement tube integrated into the course of a pipeline conducting the respective measurement material, for example by means of a flange connection, and a sensor which is mounted thereon and which is designed to sense at least one measurement variable and convert it into a corresponding sensor signal, namely a sensor signal that is dependent on the at least one measurement variable. For processing the sensor signal, such a measuring device also has a measurement electronics unit which is electrically connected to the sensor, for example also formed by means of at least one microprocessor, and which is designed to receive the at least one sensor signal and to determine measurement values for the at least one measurement variable based on the at least one sensor signal. The measurement variable may, for example, be a volumetric flow rate, a mass flow rate, a flow velocity or another flow parameter or, for example, a density, a temperature, a pressure or a pH value; the measuring device may thus be designed as a flow measuring device, namely, for example, a vortex flow measuring device, an ultrasonic flow measuring device, a Coriolis flow measuring device, a thermal flow measuring device or a magnetically inductive flow measuring device, a temperature measuring device, pressure measuring device or pH measuring device. Examples of such measuring devices are inter alia described in DE-A 10 2013 114 382, DE-A 10 2013 114 483, DE-A 102013013476, EP-B 1 413 858, EP-B 892 251, U.S. Pat. Nos. 6,003,384, 6,047,457, US-A 2003/0019308, US-A 2009/0013798, US-A 20100031755, US-A 2010/0139390, US-A 2011/0120229, US-A 2011/0303006, US-A 2012/0227496, US-A 2015/0268082, US-A 2015/0338252, US-A 2016/0069717, US-A 2016/0216145 or WO-A 2016/034417.

Accordingly, a measurement tube of the type in question is formed by means of a tubular, usually metallic and/or at least sectionally hollow cylindrical main body with a wall and a lumen, for example a cylindrical lumen, which is surrounded by the wall and which is designed to conduct the measurement material, and by means of a sensor holder for the sensor, which sensor holder is arranged on and integrally bonded to an outer lateral surface, namely a lateral surface facing away from the lumen, of the wall of the main body, which lateral surface is, for example, at least sectionally planar and/or at least sectionally curved. As inter alia also shown in each of the aforementioned U.S. Pat. No. 6,003,384, US-A 2011/0303006, DE-A 10 2013 114 382, DE-A 10 2013 114 483 or EP-B 892 251, the respective sensor may, for example, be designed as an independent probe, namely the probe which completely carries out the conversion of the physical measurement variable into the sensor signal and may possibly also protrude at least partially into the lumen of the main body; for example, as inter alia also shown in each of EP-B 1 413 858, US-A 2011/0120229, US-A 2016/0216145 or US-A 2016/0069717, the sensor can however also be a complex sensor system which is formed by means of individual components which are distributed centrally positioned along the measurement tube and may also partially protrude into the lumen of the main body.

The sensor holder, which is typically metallic or consists of the same material as the wall of the main body, is designed to be mechanically, for example also detachably, connected to at least one sensor component of the respective sensor. For this purpose, it can be designed, for example, as a connecting piece, which may also partially surround the respective sensor component, or as a platform providing a connecting surface and/or mounting surface for the at least one sensor component. For the aforementioned case in which the measuring device is an ultrasonic flow measuring device, the sensor holder may, for example, also serve as a coupling element for an ultrasonic transducer; in the case of a measuring device formed as a vortex flow measuring device, the component of the sensor connected to the sensor holder may be a disk-shaped or membrane-like deformation body which holds a sensor vane protruding into the lumen.

For connecting the sensor holder and the sensor component, the sensor holder typically always has a, usually planar, connecting surface and/or mounting surface for the at least one sensor component, which surface is shaped complementarily to a corresponding connecting surface or mounting surface of the respective sensor component. Both a contour of the sensor holder and its respective connecting surface or mounting surface can ultimately differ significantly from the lateral surface of the wall of the main body. In order to provide the sensor holder or its respective connecting surface or mounting surface, a corresponding recess can be provided, as inter alia shown in US-A 2016/0069717 or U.S. Pat. No. 6,003,384, in the wall of the main body, which recess is formed, for example, by a primary shaping method in situ or by a subtractive, namely material-removing, production method. Alternatively or additionally, a connecting piece integrally bonded to the main body, namely for example welded thereto, can for example provide the respective connecting surface or mounting surface.

As a result of the design choice, a respective size of the connecting surface or mounting surface is limited by a respective size of a cross-section of the main body as well as a thickness of its wall. In addition, in the case of integral bonding of the sensor holder and the main body, difficult-to-produce welding geometries or welding seams can occasionally result, along with correspondingly high production costs for the respective measurement tube.

SUMMARY

Starting from the aforementioned prior art, it is an object of the invention to specify a measurement tube in which the sensor holder is easily mounted on the main body and in which the sensor holder, but also not least the connecting surface or mounting surface provided thereby, can be designed and dimensioned largely independently of the shape and size of the main body of the measurement tube.

In order to achieve the object, the invention consists of a measurement tube for a measuring device, namely, for example, for a flow measuring device, which for example at least sectionally hollow cylindrical measurement tube comprises: a tubular, for example metallic and/or at least sectionally hollow cylindrical main body with a wall and a for example cylindrical lumen which is surrounded by the wall and is designed to conduct a fluid measurement material; and an, e.g., metal sensor holder and or designed as a connecting piece which is arranged on and integrally bonded to an outer lateral surface, namely a lateral surface facing away from the lumen, of the wall of the main body, which lateral surface is, for example, at least sectionally curved, which sensor holder is configured to be mechanically, for example detachably, connected at least to at least one sensor component, namely a component of a sensor serving to sense at least one measurement variable of a measurement material located in the lumen. The sensor holder of the measurement tube according to the invention is produced at least partly by an additive manufacturing method, for example a free-space method and/or a powder bed method, directly on the lateral surface of the wall of the main body, which is, for example, previously produced in a primary shaping method.

The invention moreover consists in a measuring device, for example, a flow measuring device, for measuring at least one measurement variable of a for example flowing fluid, which measuring device comprises: the aforementioned measurement tube according to the invention; a sensor, which is mounted on said measurement tube and, for example, at least partially protrudes into the lumen of the main body, for sensing at least one measurement variable of a measurement material located in the lumen of the measurement tube and for generating a sensor signal representing said measurement variable, of which sensor at least one component is mechanically, for example detachably, connected to the sensor holder; and a measurement electronics unit, which is electrically connected to the sensor and formed, for example, by means of at least one microprocessor and which is designed to receive and process the at least one sensor signal, namely, for example, to determine measurement values for the at least one measurement variable based on the at least one sensor signal.

The invention also consists of a method for producing a measurement tube for a measuring device, which method comprises:

- providing a tubular, for example metallic and/or at least sectionally hollow cylindrical main body with a wall and a for example cylindrical lumen surrounded by the wall;
- applying liquefied material, for example liquefied metal, to an outer lateral surface, namely a lateral surface facing away from the lumen, of the wall of the main body, which lateral surface is, for example, at least sectionally curved; and
- allowing liquid material applied to the outer lateral surface to solidify in order to form a part, which is integrally bonded to the wall of the main body, of a sensor holder for a sensor which serves to sense at least one measurement variable of a, for example fluid, measurement material located in the lumen, said sensor holder being provided or designed to be mechanically, for example detachably, connected at least to at least one sensor component, namely a component of the sensor.

A first embodiment of the measurement tube of the invention furthermore provides that the main body is formed by means of a for example cast, pressed or welded tube, for example a steel tube or a stainless steel tube.

A second embodiment of the measurement tube of the invention furthermore provides that the sensor holder is designed as a connecting piece having, for example, a hollow cylindrical and/or planar connecting surface and/or mounting surface for the at least one sensor component.

A third embodiment of the measurement tube of the invention furthermore provides that the sensor holder is designed as a platform having, for example, a planar connecting surface and/or mounting surface for the at least one sensor component.

A fourth embodiment of the measurement tube of the invention furthermore provides that the main body is produced by a primary shaping method, for example a casting method, and/or by a forming method, for example an extrusion method.

A fifth embodiment of the measurement tube of the invention furthermore provides that the sensor holder is produced after the production of the main body.

A sixth embodiment of the measurement tube of the invention furthermore provides that the sensor holder has at least one planar surface which is produced, for example, by a subtractive, namely material-removing, manufacturing method.

A seventh embodiment of the measurement tube of the invention furthermore provides that the sensor holder has at least one, for example planar, surface which is produced by a subtractive, namely material-removing, manufacturing method, for example milling and/or erosion.

An eighth embodiment of the measurement tube of the invention furthermore provides that the wall of the main body and the sensor holder respectively consist of an equivalent material and/or metal, for example a nickel-based alloy.

A ninth embodiment of the measurement tube of the invention furthermore provides that the wall of the main body consists of a metal, for example a nickel-based alloy.

A tenth embodiment of the measurement tube of the invention furthermore provides that the sensor holder consists of a metal, for example a nickel-based alloy.

An eleventh embodiment of the measurement tube of the invention furthermore provides that the sensor holder is at least partly produced by at least one of the following additive manufacturing methods:

selective laser melting (SLM);
selective laser sintering (SLS);
electron beam melting (EBM).

A twelfth embodiment of the measurement tube of the invention furthermore provides that the measurement tube is curved, at least sectionally A thirteenth embodiment of the measurement tube of the invention furthermore provides that the measurement tube is straight, at least sectionally.

A fourteenth embodiment of the measurement tube of the invention furthermore provides that the sensor holder is at least partly produced by at least one of the following additive manufacturing methods:

deposition welding (cladding);
metal powder application method (MPA);
cold gas spraying;
electron beam welding (EBW).

A fifteenth embodiment of the measurement tube of the invention furthermore provides a through-channel, which is, for example designed as a through-hole and which extends partially through the sensor holder and partially through the wall of the main body.

A sixteenth embodiment of the measurement tube of the invention furthermore provides at least one blind hole, which is designed for example as a blind bore, with an open end and a closed end, which blind hole extends partially through the sensor holder and partially through the tube wall such that the open end is located in the sensor holder, and the closed end is located within the wall of the main body.

A seventeenth embodiment of the measurement tube of the invention furthermore provides that the measurement tube is designed to be caused to vibrate.

According to a first embodiment of the measuring device of the invention, the measuring device is a flow measuring device, for example a vortex flow measuring device, an ultrasonic flow measuring device, a Coriolis mass flow measuring device, a vibronic density and/or viscosity measuring device, a thermal flow measuring device or a magnetically inductive flow measuring device.

According to a second embodiment of the measuring device of the invention, the measuring device is an ultrasonic flow measuring device, wherein the sensor holder serves as a coupling element for an ultrasonic transducer.

According to a third embodiment of the measuring device of the invention, the measuring device is a vortex flow measuring device, wherein the sensor component, which is connected to the sensor holder, is a for example disk-shaped or membrane-like, deformation body which holds a sensor vane protruding into the lumen.

According to a fourth embodiment of the measuring device of the invention, the measuring device is a Coriolis mass flow measuring device and/or a vibronic density and/or viscosity measuring device, wherein the sensor component, which is connected to the sensor holder, is a coil, or wherein the sensor component, which is connected to the sensor holder, is a for example cup-shaped, permanent magnet.

According to a fifth embodiment of the measuring device of the invention, the measuring device is a temperature measuring device.

According to a sixth embodiment of the measuring device of the invention, the measuring device is a pH measuring device.

According to a seventh embodiment of the measuring device of the invention, the measuring device is a pressure measuring device.

According to a first development of the method of the invention, the method furthermore includes a step of applying liquefied material, for example liquefied metal, on an outer surface, namely a surface facing away from the lumen, of a previously-formed part of the sensor holder, and a step of solidifying liquid material applied to said outer surface of the previously formed part in order to enlarge said part or form another part of the sensor holder.

According to a second development of the method of the invention, the method furthermore includes a step of removing excess material from a previously formed part of the sensor holder.

According to a third development of the method of the invention, the method furthermore includes a step of forming, for example drilling and/or milling, a through-channel extending partially through the sensor holder and partly through the tube wall.

According to a fourth development of the method of the invention, the method furthermore includes a step of forming, namely for example drilling and/or milling, a blind hole having an open end and a closed end and extending partially through the sensor holder and partially through the tube wall such that the open end is located in the sensor holder, and the closed end is located within the wall of the main body.

A basic idea of the invention consists in improving the production process of measurement tubes of the type in question so that a sensor holder adapted optimally in terms of shape and size to the respective sensor or its functionality is subsequently applied to a suitable main body, which is for example also to be produced conventionally or cost-effectively, in an automated process step, which nevertheless predominantly or even exclusively uses universal operating resources, namely in particular also manages without casting molds or dies.

BRIEF DESCRIPTION OF THE DRAWING

The invention as well as advantageous embodiments thereof are explained in more detail below based on exemplary embodiments shown in the figures of the drawings. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, in particular combinations of partial aspects of the invention that were initially explained only separately, furthermore result from the figures of the drawing and from the claims themselves.

The Figures Show in Detail.

DETAILED DESCRIPTION

Figure 1:
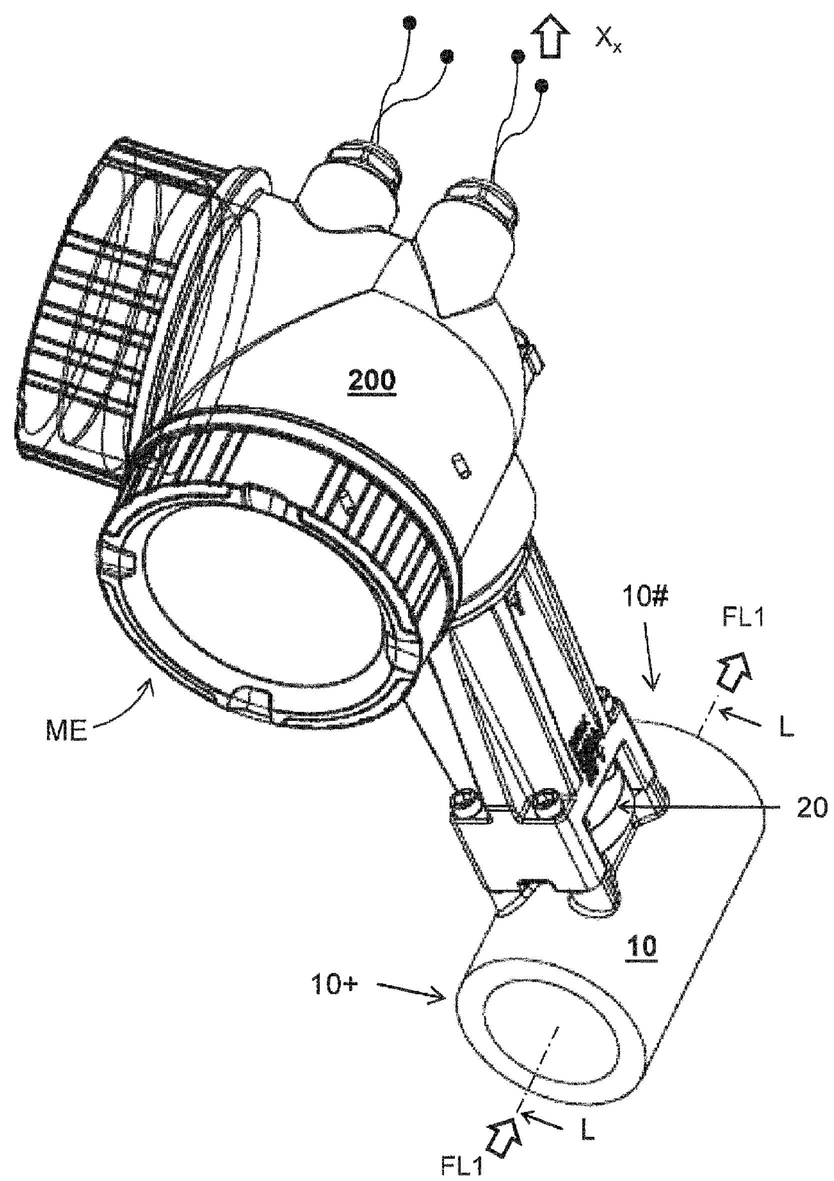
FIG. 1 shows a perspective view of a measuring device, which is, for example, designed as a flow measuring device, for measuring at least one measurement variable, which may also change over time.
Figure 2:
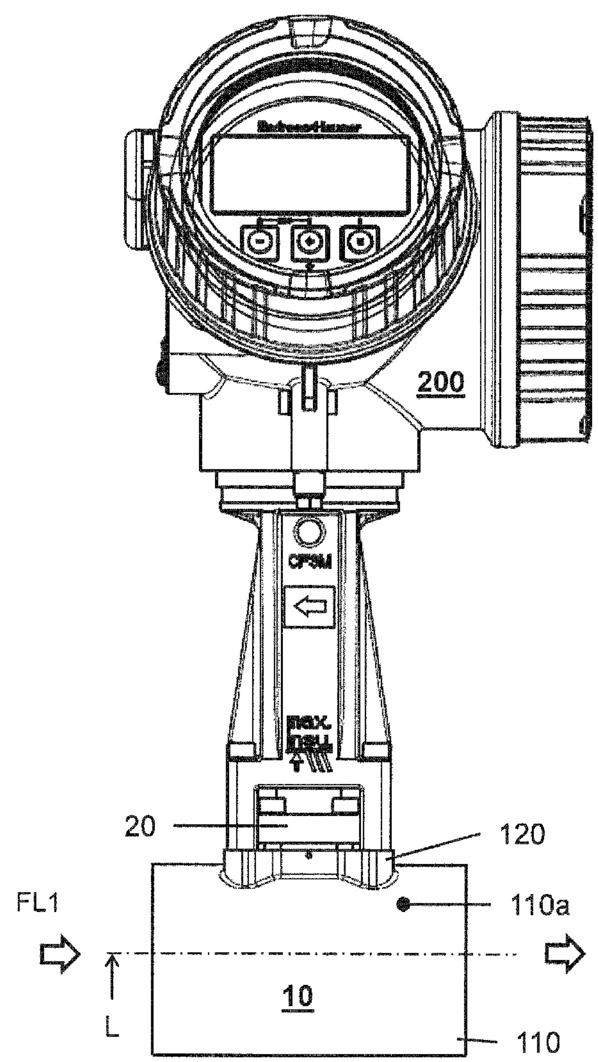
FIG. 2 shows a side view of a measuring device according to FIG. 1.
Figure 3:
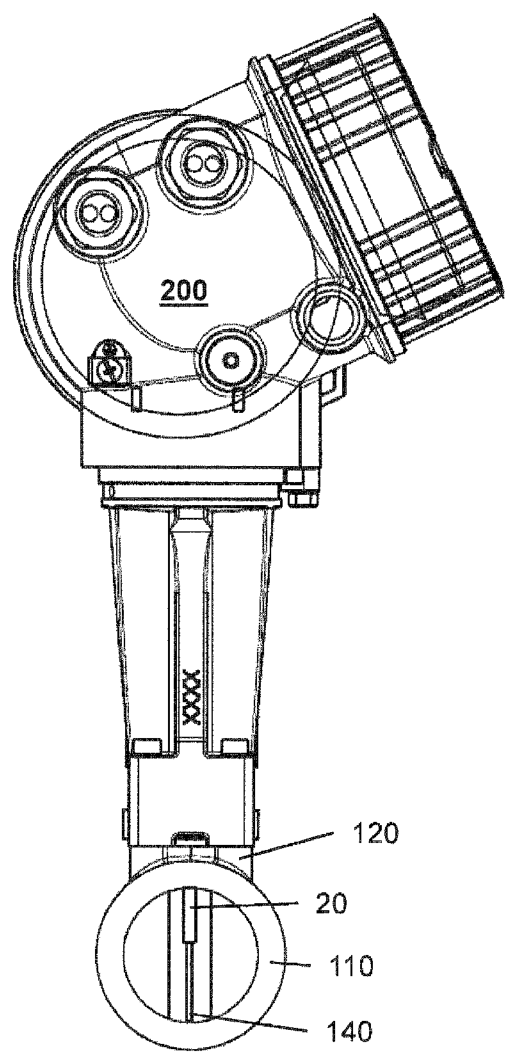
FIG. 3 shows a side view of a vortex flow measuring device suitable as measuring device according to FIG. 1.
Figure 4:
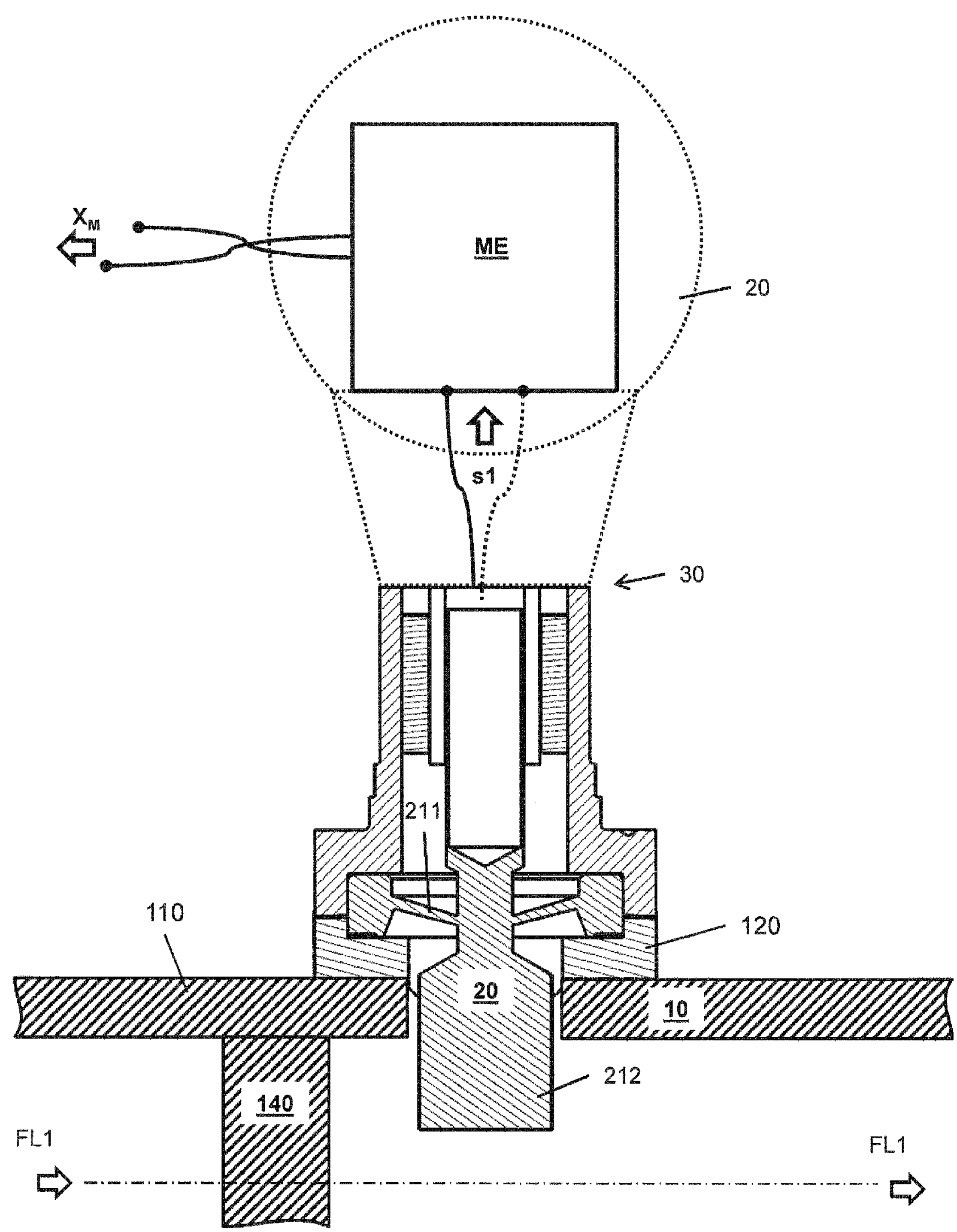
FIG. 4 shows a sectional side view of the vortex flow measuring device according to FIG. 3.

FIGS. 1 and 2 show an exemplary embodiment of a measuring device for measuring at least one measurement variable, which may also change over time, such as a flow velocity v, a volumetric flow rate V, a mass flow rate, a temperature, a pressure or a pH value, of a fluid measurement material FL1, for example a gas or a liquid, flowing in a pipeline. The measuring device may thus, for example, be a flow measuring device, namely, for example, an ultrasonic flow measuring device, a vibronic density and/or viscosity measuring device, a (vibronic) Coriolis flow measuring device, a thermal flow measuring device, a magnetically inductive flow measuring device or, as shown in FIG. 3 or 4 as well, a vortex flow measuring device; the measuring device can however also be a temperature measuring device, a pH measuring device or a pressure measuring device, for example. The pipeline in turn may be designed, for example, as a system component of a technical process, a water supply network or a heat supply network, a turbine circuit, a natural gas plant or biogas plant, a gas supply network, a loading station for petrochemical substances or the like; the fluid can thus, for example, also be drinking water, water vapor, petroleum or, for example, also a (compressed) natural gas or biogas.

Figure 5:
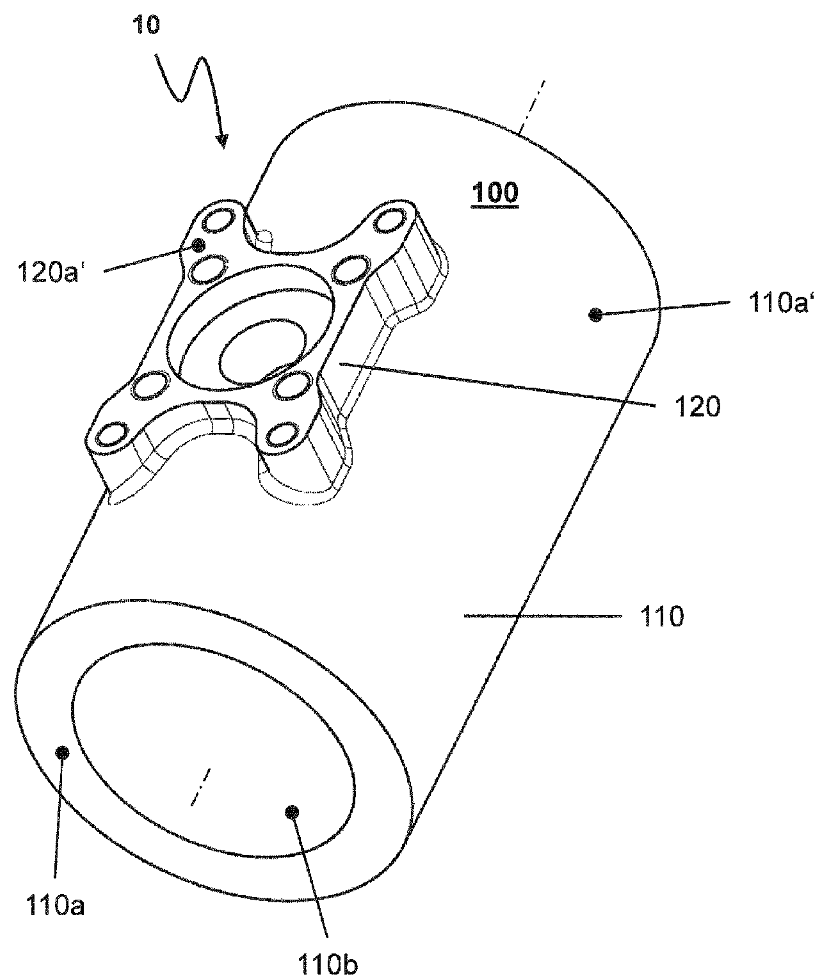
FIG. 5 shows a perspective view of a first variant of a measurement tube suitable for a measuring device according to FIG. 1, for example also for the vortex flow measuring device according to FIG. 3.
Figure 6:
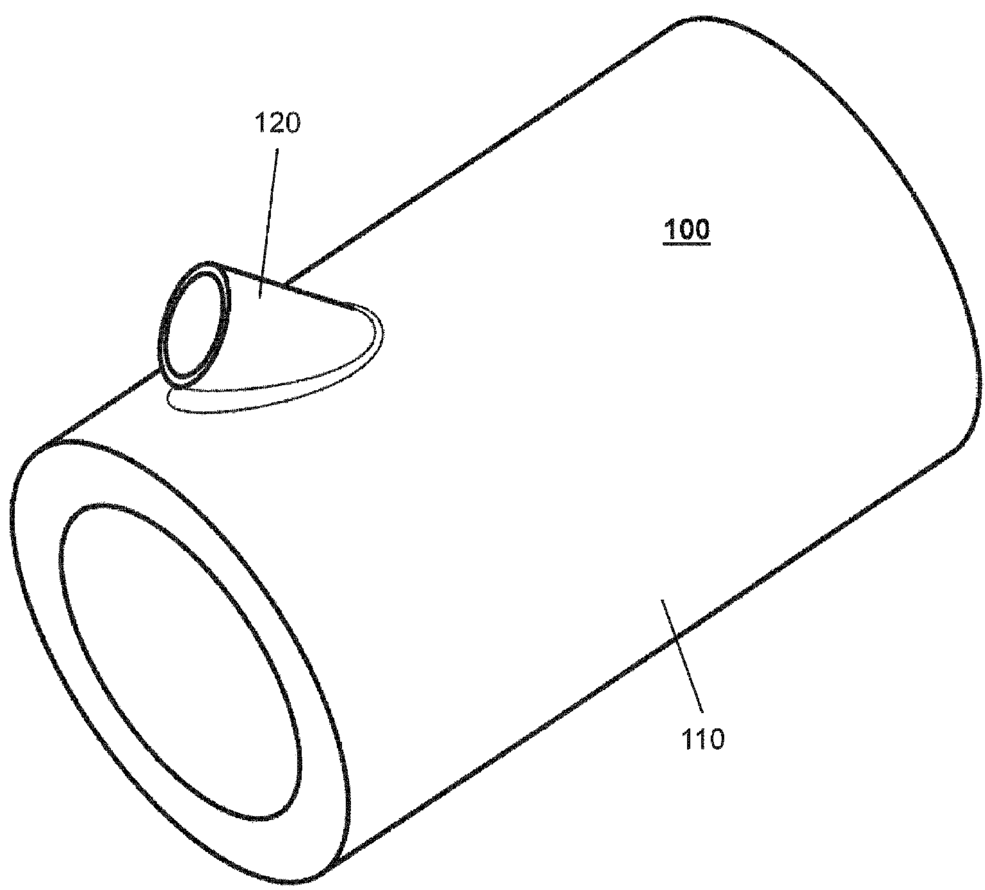
FIG. 6 shows a perspective view of a second variant of a measurement tube suitable for a measuring device according to FIG. 1, which is, for example, designed as an ultrasonic flow measuring device or as a temperature measuring device.
Figure 7:
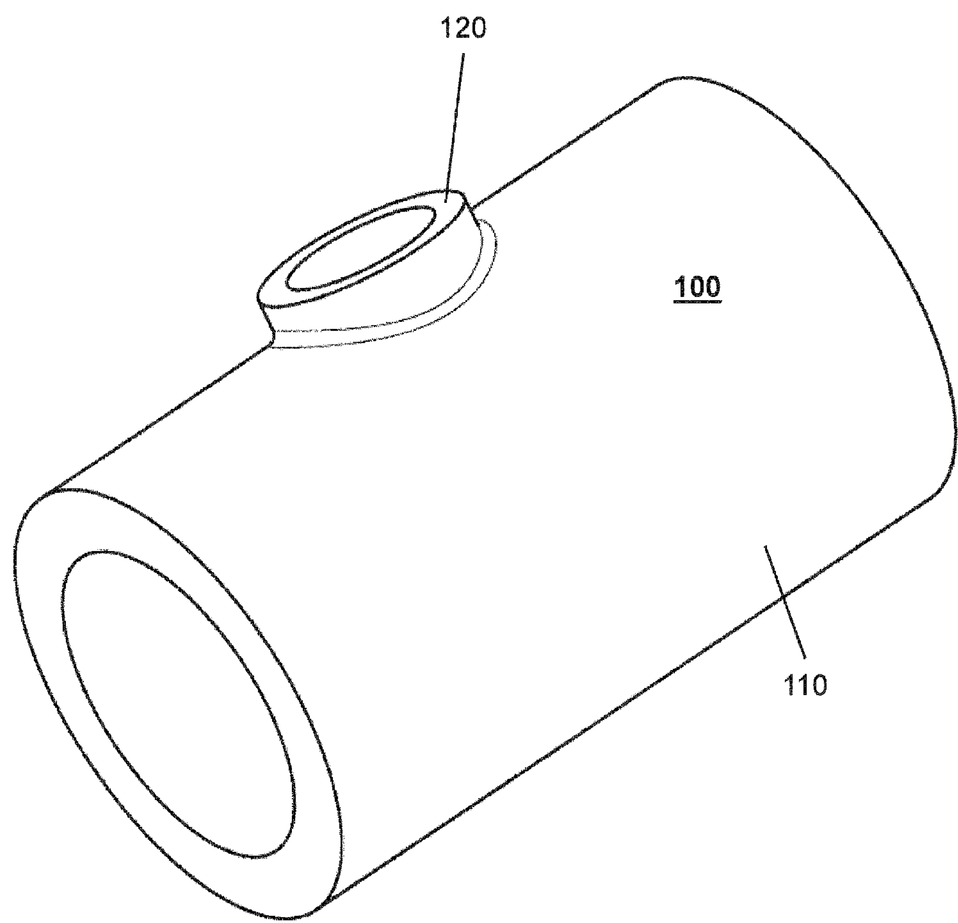
FIG. 7 shows a perspective view of a third variant of a measurement tube suitable for a measuring device according to FIG. 1, which is, for example, also designed as an ultrasonic flow measuring device, as a pH measuring device, as a pressure measuring device or, for example, also as a temperature measuring device.

The measuring device comprises an, in this embodiment, at least sectionally hollow cylindrical measurement tube 10, of which various embodiment variants are shown in FIG. 5, 6 or 7, as well as a sensor 20 fastened to said measurement tube 10.

As is also shown in FIG. 1 or readily apparent from a combination of FIGS. 1 and 5, the measurement tube 10 is formed by means of a tubular, for example metallic and/or at least sectionally hollow cylindrical main body 110 with a wall 110*a* and a lumen 110*b*, which is surrounded by the wall and which is, for example, cylindrical, and serves to conduct the respective fluid measurement material, and a sensor holder 120, which is arranged on an outer lateral surface 110*a'*, namely a lateral surface that faces away from the lumen, of the wall 110*a* of the main body 110, which outer lateral surface is also curved at least sectionally. Further, for the aforementioned case in which the measuring device is a vibronic flow measuring device, namely, for example, a vibronic density and/or viscosity measuring device or a vibronic Coriolis flow measuring device, the measurement tube according to another embodiment of the invention is designed to be caused to vibrate, for example while the measurement material flows through it.

The main body 110, or the measurement tube 10 formed therewith, extends from an inlet end 10+ to an outlet end 10# and is in particular provided to be used over the course of the aforementioned pipeline, forming a continuous flow path. At the inlet end 10+ as well as at the outlet end 10#, a flange serving respectively to produce a leak-free flange connection to a respective corresponding flange on an inlet-side or outlet-side line segment of the pipeline may accordingly also be provided. As respectively shown in FIGS. 1 and 5, the main body can furthermore be designed substantially straight, namely, for example, as a hollow cylinder with a circular cross-section such that the main body 110, or the measurement tube 10 formed therewith, ultimately has an imaginary straight longitudinal axis L imaginarily connecting the inlet end and the outlet end. Alternatively or additionally, however, the main body, or the measurement tube formed therewith, can also be curved at least sectionally, namely, for example, be designed substantially V-shaped or U-shaped. According to an embodiment of the invention, the wall of the main body 110 consists of a metal, for example a metal alloy containing titanium, tantalum and/or zirconium, a nickel-based alloy or optionally a stainless steel, for example. The main body 110 can accordingly be formed, for example, by means of a tube, in particular a cast, pressed or welded tube, namely, for example, optionally also a seamless steel or stainless steel tube. In addition, the main body may be produced by a primary shaping method, such as a casting method, and/or by a forming method, such as an extrusion method.

The sensor holder 120 of the measurement tube 10 according to the invention, or of the measuring device formed therewith, is integrally bonded to the wall 110*a* of the main body 110 and is in particular provided or designed to be mechanically, in particular detachably, connected at least to at least one sensor component, namely one component of the sensor 20. For this purpose, as shown in FIG. 5 as well, the sensor holder 120 can be designed, for example, as a platform, in particular a solid platform, or, as indicated in FIGS. 6 and 7 respectively, as a connecting piece, in particular a hollow cylindrical connecting piece, for example. For positioning and fastening the sensor 20 to the sensor holder 120, said sensor holder according to another embodiment of the invention has, for the at least one sensor component, a connecting surface and/or mounting surface 120*a'*, which is in particular planar, i.e., flat, and/or complementary to a corresponding connecting surface of the sensor. Said connecting surface and/or mounting surface 120*a'* may further be at least partially formed as a sealing surface which is designed to allow, in cooperation with a corresponding sealing surface of the aforementioned sensor component of the sensor 20, an intimate, in particular fluid-tight or leak-free, connection of sensor 20 and sensor holder 120, possibly also with the interposition of a corresponding sealing element, such as an annular or annular disk-shaped seal. According to another embodiment of the invention, the sensor holder 120 consists of a metal, for example INCONEL®718, or another nickel-based alloy, and/or an equivalent material at least with regard to its chemical composition as the wall of the main body. For example, the wall 110 and the sensor holder 120 may be produced from the same metal alloy. Furthermore, the sensor 20 can, for example, also be fixed to the measurement tube by integrally bonding, in particular by welding or soldering, the sensor holder and the associated sensor component; however, it can however also be detachably connected to the sensor holder, namely, for example, bolted or screwed.

The sensor 20 of the measuring device according to the invention is in particular provided or designed to sense the at least one measurement variable of the measurement material located in the lumen of the measurement tube 10 and to generate a sensor signal s1 representing said measurement variable. The sensor 20 and the measurement tube 10 may, for example, be designed for this purpose such that the sensor 20 is only mounted on the outside on the measurement tube, although not protruding into the lumen, or that the sensor 20 senses the measurement variable through the wall 110*a* of the main body; the sensor 20 and measurement tube 10 can, however, for example, also be designed such that, as also shown in FIG. 4, the sensor 20 can be inserted from the outside into the lumen of the main body 110 or of the measurement tube through a through-channel 3" extending partially through the sensor holder 120 and partially through the tube wall, namely a continuous opening formed into the sensor holder 120 and the wall 110, or designed as a through-hole. The sensor 20 can in particular be inserted into the through-channel 3" in such a way that the sensor component covers it or hermetically seals it. In an end region of the through-channel 3" facing the sensor 20, a mount 3*a* which at least partially receives, namely laterally surrounds, the sensor component can be formed in the sensor holder. The through-channel can, for example, be produced or be designed by correspondingly drilling and/or milling out material from the wall 110 and the sensor holder 120 such that it has an (inner) diameter which is in a range between 10 mm and approximately 50 mm.

As can be seen from a combination of FIGS. 1, 2, 3 and 4, the measuring device further comprises a measurement electronics unit ME, which is, for example, accommodated in a pressure-resistant and/or impact-resistant protective housing 200 and/or formed by means of at least one microprocessor and electrically connected to the sensor and designed to receive and to process the at least one sensor signal, namely, for example, to recurrently determine measurement values $X_M$ for the at least one measurement variable based on the at least one sensor signal. Measurement values $X_M$ generated by means of the measurement electronics unit ME can, for example, be visualized in situ and/or be transmitted in a wired manner via a connected field bus and/or in a wireless manner via radio to an electronic data processing system, for example a programmable logic controller (PLC) and/or a process control station. The protective housing 200 for the measurement electronics unit MU may, for example, be produced from a metal, such as a stainless steel or aluminum, and/or by means of a casting method, such as an investment casting or a die casting method (HPDC); it can however, for example, also be formed by means of a plastic molded part produced in an injection molding method. In the exemplary embodiments shown in FIGS. 1-4 respectively, the measuring device is moreover designed as a compact-design measuring device, in which the protective housing 200 with the measurement electronics ME arranged therein is thus held on the measurement tube, namely, for example, by means of a neck-shaped connecting piece 30 which is also detachably fixed in this case to the sensor holder 120 and additionally also surrounds components of the sensor.

As mentioned and indicated in FIG. 3 or 4, the measuring device can, for example, be a vortex flow measuring device and therefore such a measuring device in which the sensor 20 is provided or designed to sense pressure fluctuations corresponding to a flow velocity or a volumetric flow rate in the measurement material flowing through the measurement tube and in which the sensor signal s1 depends on said pressure fluctuations. The component of the sensor 20 connected to the sensor holder can in this case, for example, be a deformation body 211, which holds a sensor vane 212 protruding into the lumen and which is in particular disc-shaped or membrane-like. The deformation body 211 and the sensor vane 212 can in this case be, for example, components of one and the same monolithic molded part which is produced, for example, in a primary shaping method; however, the deformation body and the sensor vane can also be designed as individual parts which are initially separate from one another or are only subsequently integrally bonded to each other, namely, for example, welded or soldered to one another, and therefore produced from materials that can correspondingly be integrally bonded to each other. As is quite usual with such sensors, the deformation body 211 can consist at least partially, namely, for example, predominantly or completely, of a metal such as stainless steel or a nickel-based alloy. The sensor vane 212 can likewise consist at least partially of a metal, namely, for example, a stainless steel or a nickel-based alloy; the deformation body and the sensor vane can in particular also be produced from the same material. In order to generate the aforementioned pressure fluctuations, as also indicated in FIGS. 3 and 4 or apparent from a combination of these figures, a damming body 140 serving to cause a Kármán vortex street in the flowing fluid may furthermore be provided in the lumen of the main body 110 or of the measurement tube, namely, in this case, upstream of the sensor 20, wherein the sensor and damming body are dimensioned and arranged such in this case that the sensor vane 212 protrudes into the lumen 110* or the measurement material FL1 conducted therein in a region that is occupied by the aforementioned Kármán vortex street during operation of the measuring system so that the pressure fluctuations sensed by means of the sensor 20 are periodic pressure fluctuations caused at the damming body 140 by opposing vortices separated at a separation rate ($\sim 1/f_{Vtx}$) dependent on the flow velocity or volumetric flow rate, and the sensor signal s1 has a signal frequency ($\sim f_{Vtx}$) corresponding to the separation rate of said vortices.

In order to generate the sensor signal s1, the sensor 20 furthermore comprises at least one physical-electrical transducer element. In the exemplary embodiment shown in FIG. 4, said transducer element can be designed as a piezoelectric or capacitive transducer element that converts movements of the sensor vane or, similarly, temporally changing deformations of the deformation body into a variable electrical voltage. For the other mentioned case in which the measuring device is an ultrasonic flow measuring device, the transducer element can, for example, be a piezoelectric ultrasonic transducer, or the sensor holder can, for example, also serve as a coupling element for such an ultrasonic transducer of said ultrasonic flow measuring device. For the also mentioned case in which the measuring device is a vibronic flow measuring device, for example a Coriolis mass flow measuring device and/or a vibronic density measuring device, the component of the sensor connected to the sensor holder can for example be a coil or for example a permanent magnet, which is in particular cup-shaped.

In the measurement tube 10 according to the invention, or the measuring device formed therewith according to the invention, the sensor holder 120 is produced at least partially by an additive manufacturing method directly on the lateral surface of the wall of the main body 110, which was previously produced, for example, in a primary shaping method and/or a forming method. Accordingly, the sensor holder is therefore produced only after the main body, namely in situ on said main body. The additive manufacturing method used for producing the sensor holder can be, for example, a so-called free-space method, such as a deposition welding method (cladding), a metal powder application method (MPA), an electron beam welding method (EBW) or a cold gas spraying method, or even a so-called powder bed method, such as selective laser melting (SLM), single-selective laser sintering (SLS) or electron beam melting (EBM).

In an additive method which is advantageous for producing the measurement tube or its sensor holder, the main body 110 is first provided and material liquefied on said main body 110, for example a liquefied nickel-based alloy or another liquefied metal, is subsequently applied to an outer lateral surface 110*a*', namely a lateral surface facing away from the lumen, of the wall 110*a* of the main body 110, which surface is also optionally curved at least sectionally. In order to form a part of the sensor holder 120 which is integrally bonded to the wall 110*a* of the main body 110, (still) liquid material applied to the outer lateral surface 110*a*' is then allowed to solidify there. According to a further embodiment of the invention, liquefied material is furthermore again applied to an outer surface, namely a surface facing away from the lumen, of a previously-formed part of the sensor holder 120 and then allowed to solidify there so as to further enlarge said part, or so as to form another part of the sensor holder. This process may optionally be repeated several times, for example until a predetermined desired shape and size has been produced for the sensor holder or its part.

The material used in the process can respectively always be the same material, namely, for example, also the same material as for the part directly connected to the wall of the main body; however, if necessary, a different material for the part directly connected to the wall of the main body may, for example, also be used, or different materials, possibly alternately for the formation of the aforementioned further parts, may also be used. In order to form parts of the sensor holder 120, the main body 110 can also be rotated (back and forth) about the imaginary longitudinal axis L and/or moved forward and backward translationally along said longitudinal axis during the application of liquefied material. The application of liquefied material to the wall of the main body that serves to form the sensor holder can, for example, be carried out by means of a multi-functional machine (DONE-in-One) as is offered, for example, by the company Yamazaki Mazak UK Ltd. under the trade name of "INTEGREX i-400."

According to a further embodiment of the invention, the sensor holder has at least one surface which is produced by a subtractive, namely material-removing, manufacturing method, namely, for example, by milling and/or eroding. Said possibly also planar surface can, for example, also be the aforementioned connecting surface and/or mounting surface 120*a*' of the sensor holder 120. Accordingly, the production method according to the invention, which is used to produce the sensor holder, can also comprise removal of excess material from a previously formed part of the sensor holder, for example in direct succession to the additive manufacturing by means of the aforementioned multi-function machine ("INTEGREX i-400").

Figure 8:
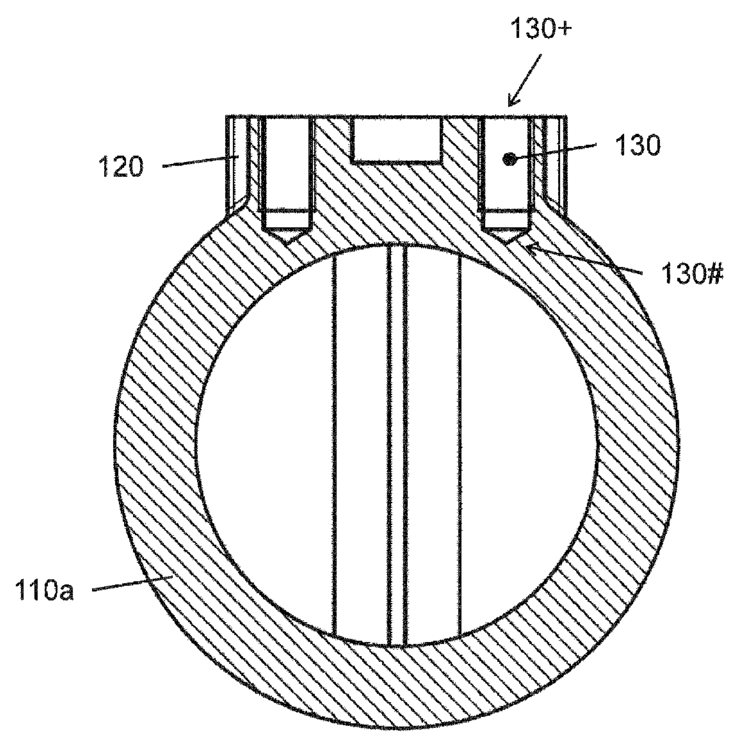
FIG. 8 shows a sectional side view of a further variant of a measurement tube suitable for a measuring device according to FIG. 1 or according to FIG. 3.

In order to increase a mechanical strength of the sensor holder and/or a connecting force holding the sensor holder on the wall, it may be advantageous to provide additional anchoring means on the measurement tube. Such an anchoring means can, for example, be a stay bolt which is firmly connected to the wall 110*a*, namely, for example, welded to the lateral surface 110*a*' of the wall 110*a*, in the region of the sensor holder before its production, and which is ultimately embedded in the sensor holder formed thereafter. In order to increase the aforementioned connecting force holding the sensor holder on the wall, said stay bolt can additionally have, on its outer surface contacting the sensor holder, interlocking contours, such as one or more grooves and/or an external thread and/or a screw head. Alternatively or additionally, a bolt which is screwed to the wall or screwed into the wall and which is, for example, designed as a threaded rod or a screw can however also be used to increase the aforementioned mechanical strength or aforementioned connecting force. Said bolt may, for example, also be screwed into the wall before the manufacturing of the sensor holder. The wall 110*a* and the sensor holder 120 may however also be designed such that said bolt can, for example, only be connected to the measurement tube after completion of the sensor holder. For this purpose, another embodiment provides in the measurement tube according to the invention at least one blind hole 130, which is, for example, designed as a blind bore and which has an open end 130+ and a closed end 130# and which extends partially through the sensor holder 120 and partially through the wall 110*a* such that, as FIG. 8 shows schematically, the end 130+ is located in the sensor holder 120, and the end 130# is located within the wall 110*a* of the main body 110. Said blind hole 130 can also have a corresponding internal thread extending from the end 130+ to a region of the blind hole 130 located within the wall 110*a*. Accordingly, the production method according to the invention used to produce the sensor holder 120 may also include forming, namely, for example, drilling and/or milling, a blind hole 130 which has an open end 130+ and a closed end 130# and which extends partially through the sensor holder and partially through the tube wall such that the end 130+ is located in the sensor holder, and the end 130# is located within the wall 110*a* of the main body 110. The use of the aforementioned anchoring means, in particular of the aforementioned stay bolt and/or the aforementioned bolt, inter alia has the advantage that otherwise possibly required elaborate examinations and tests of the material structure of the sensor holder 120, for example by x-ray or ultrasonic measurements to be performed on the finished measurement tube or elaborate pressure tests of the measurement tube after the production of the measurement tube can thus completely or partially be dispensed with.

The invention claimed is:

1. A measurement tube for a measuring device, comprising:

a tubular, hollow cylindrical main body having a wall and a lumen defined by the wall and adapted to conduct a fluid material to be measured, the wall including an outer lateral surface facing away from the lumen, wherein the outer lateral surface is curved at least sectionally, wherein the lumen defines a longitudinal axis of the main body, and wherein the main body is prefabricated by a primary manufacturing method; and a sensor holder disposed on and integrally bonded to the outer lateral surface, the sensor holder including a planar mounting surface and a through-channel, which defines a single holder axis, which is perpendicular to the longitudinal axis of the main body, wherein the sensor holder is configured to enable at least one sensor component to be detachably connected thereto and in communication with the lumen of the main body, wherein the at least one sensor component is a component of a sensor configured to sense at least one measurement variable of the fluid material in the lumen, wherein the sensor holder is formed directly on the outer lateral surface of the prefabricated main body at least partly by an additive manufacturing method, and wherein the primary manufacturing method differs from the additive manufacturing method.

2. The measurement tube of claim 1, wherein the primary manufacturing method by which the main body is formed includes a steel tube or a stainless steel tube that has been cast, pressed or welded.

3. The measurement tube of claim 1, wherein the sensor holder is configured as a connecting piece such that the mounting surface adapted for connecting to the at least one sensor component, wherein the mounting surface is parallel to the longitudinal axis of the main body and perpendicular to the holder axis.

4. The measurement tube of claim 1, wherein the primary manufacturing method by which the main body is formed includes a primary shaping method and/or a forming method, wherein the primary shaping method includes a casting method, and wherein the forming method includes an extrusion method.

5. The measurement tube of claim 1, wherein the sensor holder includes at least one planar surface formed by a subtractive, material-removing manufacturing method.

6. The measurement tube of claim 5, wherein the subtractive, material-removing manufacturing method includes milling and/or eroding.

7. The measurement tube of claim 1, wherein the wall of the main body and the sensor holder consist essentially of the same material.

8. The measurement tube of claim 1, wherein the wall of the main body includes a nickel-based metal alloy and/or the sensor holder includes a nickel-based metal alloy.

9. The measurement tube of claim 1, wherein the additive manufacturing method used to at least partly form the sensor holder includes at least one of selective laser melting, selective laser sintering, electron beam melting, deposition welding, metal powder application, cold gas spraying and electron beam welding.

10. The measurement tube of claim 1, wherein the measurement tube further includes at least one through-channel or through-hole that extends partially through the sensor holder and partially through the wall of the main body.

11. The measurement tube of claim 1, wherein the measurement tube further includes at least one blind hole having an open end and a closed end, wherein the at least one blind hole extends partially through the sensor holder and partially through the wall of the main body such that the open end is in the sensor holder and the closed end is within the wall of the main body.

12. The measurement tube of claim 1, wherein the main body is curved at least sectionally and/or straight at least sectionally relative to a longitudinal axis thereof, and/or wherein the main body is configured to be caused to vibrate.

13. The measurement tube of claim 1, wherein the sensor holder includes a side wall which extends from a perimeter of the mounting surface, parallel to the holder axis, and intersects the outer lateral surface such that the sensor holder has a footprint that is essentially a projection of the mounting surface onto the outer lateral surface.

14. A measuring device for measuring at least one measurement variable of a fluid, the measuring device comprising:

a measurement tube comprising:

a tubular, hollow cylindrical main body having a wall and a lumen defined by the wall and adapted to conduct a fluid material to be measured, the wall including an outer lateral surface facing away from the lumen, the outer lateral surface curved at least sectionally, wherein the lumen defines a longitudinal axis of the main body, and wherein the main body is prefabricated by a primary manufacturing method; and a sensor holder disposed on and integrally bonded to the outer lateral surface, the sensor holder including a planar mounting surface and a through-channel, which defines a single holder axis, which is perpendicular to the longitudinal axis of the main body, wherein the sensor holder is configured to enable at least one sensor component to be detachably connected thereto and in communication with the lumen of the main body, wherein the sensor holder is formed directly on the outer lateral surface at least partly by an additive manufacturing method, and wherein the primary manufacturing method differs from the additive manufacturing method;

a sensor fastened to the measurement tube and protruding at least partially into the lumen of the main body, the sensor configured to sense at least one measurement variable of the fluid material in the lumen and to generate a sensor signal representing the at least one measurement variable, wherein the sensor is detachably, mechanically fastened to the sensor holder via the at least one sensor component, which is a component of the sensor; and an electronics unit electrically connected to the sensor and including at least one microprocessor, the electronics unit configured to receive and process the sensor signal and to determine, based on the sensor signal, measurement values for the at least one measurement variable.

15. The measuring device of claim 14, wherein the measuring device is a vortex flow measuring device, an ultrasonic flow measuring device, a Coriolis flow measuring device, a vibronic density and/or viscosity measuring device, a thermal flow measuring device, or a magnetically inductive flow measuring device.

16. The measuring device of claim 14, wherein the measuring device is an ultrasonic flow measuring device, wherein the sensor holder serves as a coupling element for an ultrasonic transducer.

17. The measuring device of claim 14, wherein the measuring device is a vortex flow measuring device, wherein the at least one sensor component connected to the sensor holder is a deformation body that holds a sensor vane protruding at least partially into the lumen and is disc-shaped or membrane-like.

18. The measuring device of claim 14, wherein the measuring device is a Coriolis mass flow measuring device and/or a vibronic density and/or viscosity measuring device, wherein the at least one sensor component connected to the sensor holder is a coil or a permanent magnet.

19. The measuring device of claim 14, wherein the measuring device is a temperature measuring device.

20. The measuring device of claim 14, wherein the measuring device is a pH measuring device.

21. The measuring device of claim 14, wherein the measuring device is a pressure measuring device.

22. A method for producing a measurement tube for measuring device, the method comprising:

providing a prefabricated, tubular, metallic, at least sectionally hollow cylindrical main body having a wall and a lumen, the lumen defined by the wall, wherein the wall includes an at least sectionally curved outer lateral surface facing away from the lumen, wherein the main body is prefabricated by a primary manufacturing method;

applying liquefied metal to the outer lateral surface; and allowing the liquefied metal applied to the outer lateral surface to solidify, thereby forming at least a portion of a sensor holder that is integrally bonded to the wall of the main body, wherein the sensor holder is formed to enable at least one sensor component of a sensor to be detachably mechanically connected to the sensor holder and in communication with the lumen of the main body, wherein the sensor is adapted to sense at least one measurement variable of a fluid to be measure in the lumen, wherein the primary manufacturing method differs from the operation of applying the liquefied metal.

23. The method of claim 22, further comprising:

applying additional liquefied metal to a formed surface of a previously formed portion of the sensor holder; and allowing the additional liquid metal to solidify such that the sensor holder is enlarged or to form a further portion of the sensor holder.

24. The method of claim 23, further comprising removing excess material from a previously formed part of the sensor holder.

25. The method of claim 22, further comprising:

forming, by drilling and/or milling, a through-channel extending partially through the sensor holder and partially through the wall of the main body; and/or forming, by drilling and/or milling, a blind hole having an open end and a closed end and extending partially through the sensor holder and partially through the wall of the main body such that the open end is in the sensor holder and the closed end is within the wall of the main body.

* * * * *